(No Model.)

C. E. GETCHELL.
SPINDLE BEARING FOR SPINNING AND TWISTING MACHINES.

No. 460,007. Patented Sept. 22, 1891.

Witnesses:
Edward F. Allen
Fred S. Greenleaf

Inventor,
Charles E. Getchell.
by Crosby & Gregory attys.

UNITED STATES PATENT OFFICE.

CHARLES E. GETCHELL, OF PALMER, ASSIGNOR TO GEORGE DRAPER & SONS, OF HOPEDALE, MASSACHUSETTS.

SPINDLE-BEARING FOR SPINNING AND TWISTING MACHINES.

SPECIFICATION forming part of Letters Patent No. 460,007, dated September 22, 1891.

Application filed April 28, 1891. Serial No. 390,820. (No model.)

*To all whom it may concern:*

Be it known that I, CHARLES E. GETCHELL, of Bond's Village, Palmer, Massachusetts, have invented an Improvement in Spindle-Bearings for Spinning and Twisting Machines, of which the following description, in connection with the accompanying drawings, is a specification, like letters on the drawings representing like parts.

Many different plans have been devised for supporting the spindles in spinning-machines in such manner as to enable them to be rotated with the minimum of friction.

Some spindle-supports have been provided with roller or ball bearings; and this invention has for its object to improve that class of bearings having balls or rolls.

In accordance with my invention the rolls are held in place in a peculiar manner and by peculiar devices, which I will describe.

Figure 1:
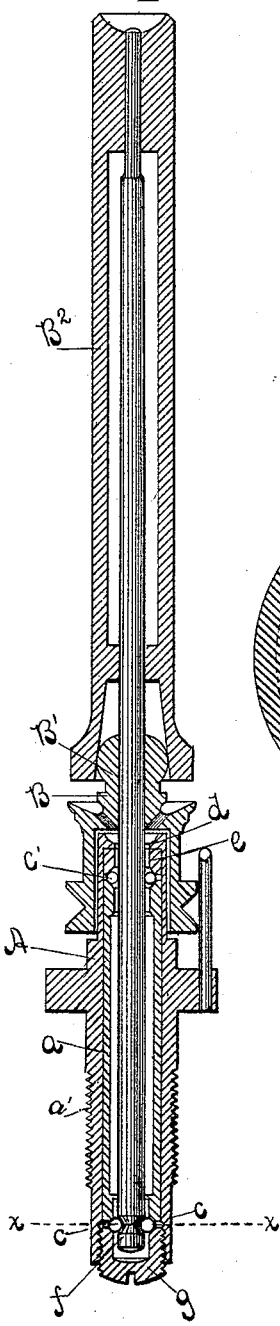
Figure 2:
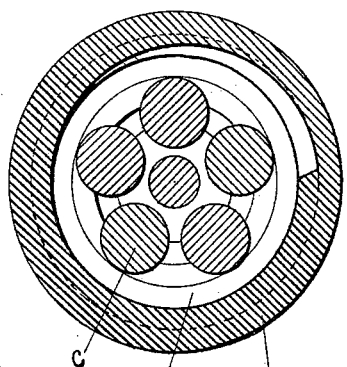
Figure 3:
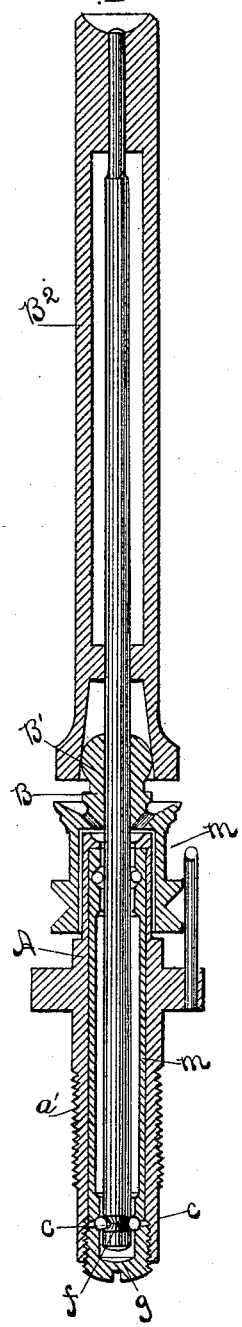

Figure 1 in vertical section shows a spinning-spindle bearing containing my invention, the spindle represented in elevation having a bobbin thereon in section. Fig. 2 is an enlarged section in the line $x$, Fig. 1; and Fig. 3 is a modification of my invention.

Referring to the drawings, A represents a supporting-case having a flange to rest upon any usual post or bolster-rail of a spinning-machine, the shank of the supporting-case below its shoulder being provided with a screw-thread, as $a'$, to in practice receive any usual nut or device employed to secure the supporting-case in position upon the rail. I have placed within the supporting-case a separating-sleeve $a$, having its ends suitably beveled to act against rolls $c\ c'$, the bearing-sleeve determining the distance apart of the said balls with relation to the length of the spindle. The upper end of the supporting-case has an inturned flange $d$, against which is placed a collar $e$, beveled at its lower end next the upper beveled end of the sleeve $a$, the rolls $c'$ being confined in the space between the beveled ends of the collar and sleeve and the periphery of the spindle by the spindle itself. The lower end of the spindle is provided with an annular groove $f$, and, as herein represented, the supporting-case at and within its lower end is provided with a screw-thread to receive a chambered nut $g$, made cup-shaped and having its inner end beveled to act against the rolls $c$, kept in position between the said nut and the lower end of the sleeve $a$.

By the employment of the sleeve and the separate collar $e$ and the separate nut $g$ it is possible, by simply rotating the nut $g$, to so adjust the parts as to compensate for any wear between the bearing-balls and the parts upon which they run or rest as they move.

The spindle has attached to it a sleeve-whirl B, having, as represented, a spherical top B', the bobbin $B^2$ taking its upper bearing upon the upper end of the blade of the spindle and its lower bearing upon the spherical top of the whirl, the bobbin herein represented having an additional bushing near its lower end to contact with the blade of the spindle.

The construction, Fig. 3, differs from that shown in Fig. 1 only in that the sleeve marked $m$, which corresponds with the sleeve $a$, is made in one piece with the part $m'$, whereas in Fig. 1 the corresponding part $e$ is separate from the sleeve. In Fig. 3, however, the rotation of the nut $g'$ in the supporting-case will enable any wear to be taken up at and about the lower set of rolls $c$.

In Fig. 2, on an enlarged scale, I have shown the balls enlarged.

The lower set of balls $c$, by entering the groove $f$ in the lower end of the spindle, besides serving as a lateral bearing, also act to sustain the weight of the spindle.

I claim—

1. In a spindle-bearing, a supporting case or shell combined with a sleeve therein, a series of balls or rolls supported at or near the upper end of the said sleeve, a series of balls located at or near the lower end of the said sleeve to serve as upper and lower bearings for a spindle, combined with a nut to support the lowermost series of rolls or balls, substantially as described.

2. In a spindle-bearing, a supporting-case having within it a sleeve combined with a collar, as $e$, and a nut, said collar and nut being located at or near opposite ends of the sleeve, a series of balls or roller-bearings located between the said sleeve and the said collar and nut and serving as bearings for the spindle, the combination being and operating substantially as described.

3. In a spindle-bearing, a supporting case or shell internally threaded at one end and having an inturned flange at its other end, combined with a sleeve in said shell, a collar abutting against the flange, a nut in said threaded end of the shell, and a series of balls or roller-bearings located between said sleeve and the collar and nut to serve as bearings for the spindle, rotation of the nut adjusting the wearing-surfaces of both series of balls simultaneously, substantially as described.

In testimony whereof I have signed my name to this specification in the presence of two subscribing witnesses.

CHARLES E. GETCHELL.

Witnesses:
 WILLIAM W. LEACH,
 CHARLES L. GARDNER.